United States Patent [19]

Kosinski

[11] Patent Number: 5,106,888

[45] Date of Patent: * Apr. 21, 1992

[54] POLYACETAL COMPOSITIONS STABILIZED WITH MICROCRYSTALLINE OR FIBROUS CELLULOSE AND AT LEAST ONE CO-STABILIZER COMPOUND

[75] Inventor: Leonard E. R. Kosinski, Washington, W. Va.

[73] Assignee: E. I. Du Pont de Nemours and Company, Wilmington, Del.

[*] Notice: The portion of the term of this patent subsequent to Feb. 4, 2009 has been disclaimed.

[21] Appl. No.: 536,376

[22] Filed: Jun. 11, 1990

Related U.S. Application Data

[63] Continuation-in-part of Ser. No. 483,606, Feb. 22, 1990, abandoned.

[51] Int. Cl.$^5$ .......................... C08L 59/00; C08L 1/08
[52] U.S. Cl. .......................... 524/35; 524/36; 524/377; 524/386; 524/387
[58] Field of Search .................. 524/35, 36, 377, 386, 524/387

[56] References Cited

U.S. PATENT DOCUMENTS

| | | | |
|---|---|---|---|
| 3,406,129 | 10/1968 | Price | 260/13 |
| 3,406,130 | 10/1968 | Neff | 260/13 |
| 4,111,887 | 9/1978 | Shaner et al. | 260/37 AC |
| 4,766,168 | 8/1988 | West | 524/377 |
| 4,772,662 | 9/1988 | Collart et al. | 525/54.23 |
| 4,814,397 | 3/1989 | Novak | 525/154 |

OTHER PUBLICATIONS

Co-pending U.S. patent application Ser. No. 07/327,664, filed Mar. 17, 1989.
Co-pending U.S. patent application Ser. No. 07/366,558, filed Jun. 15, 1989.

*Primary Examiner*—Joseph L. Schofer
*Assistant Examiner*—Jeffrey T. Smith

[57] ABSTRACT

Incorporation of 0.05 to 5 weight percent of a microcrystalline or fibrous cellulose having an average particle size of 100 microns or less and 0.05 to 4 weight percent of at least one co-stabilizer compound selected from the group consisting of polyamides and polymers or oligomers containing hydroxy groups into polyacetal molding compositions results in improved thermal stability of such compositions.

22 Claims, No Drawings

POLYACETAL COMPOSITIONS STABILIZED WITH MICROCRYSTALLINE OR FIBROUS CELLULOSE AND AT LEAST ONE CO-STABILIZER COMPOUND

DESCRIPTION

This is a continuation-in-part of co-pending U.S. patent application Ser. No. 07/483,606, filed Feb. 22, 1990 now abandoned.

TECHNICAL FIELD

This invention relates to certain polyacetal compositions which are characterized by improved stability and processing due to the inclusion therein of microcrystalline or fibrous cellulose, both of which are non-melting at the temperature at which the polyacetal is melt processed, and at least one co-stabilizer compound.

Polyacetal compositions are generally understood to include compositions based on homopolymers of formaldehyde, the terminal groups of which are end-capped by esterification or etherification, as well as copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Compositions based on polyacetals of relatively high molecular weight, i.e. 10,000 to 100,000 are useful in preparing semi-finished and finished articles by any of the techniques commonly used with thermoplastic materials, e.g. compression molding, injection molding, extrusion, blow molding, rotational molding, melt spinning, stamping and thermoforming. Finished articles made from such compositions possess desirable physical properties, including high stiffness, strength, low coefficient of friction, and good solvent resistance. However, in certain applications, it would be desirable to improve the thermal stability of the polyacetal composition. By the present invention, such improved thermal stability has been attained through the use of a mixed thermal stabilizer system that contains microcrystalline or fibrous cellulose, both of which are non-melting at the temperature at which the polyacetal is melt processed, and at least one co-stabilizer compound.

BACKGROUND ART

U.S. Pat. No. 4,766,168 discloses hydroxy-containing polymers or oligomers as stabilizers for polyacetal. Microcrystalline and fibrous cellulose, both of which are non-melting at the melt processing temperature of polyacetal, are not specifically disclosed within this reference. Further, there is no recognition in this reference of the advantages that are obtained with the specific stabilizer combination used in the present invention.

U.S. Pat. No. 4,722,662 discloses a process for manufacturing oxymethylene copolymers stabilized against thermal degradation, comprising the heating of the copolymer in a medium containing water and a disubstituted cellulose ether to hydrolyze unstable oxymethylene ends and then separating said oxymethylene copolymer from said aqueous medium containing a disubstituted cellulose ether. Disubstituted cellulose ethers are known thermoplastics.

U.S. Pat. No. 4,111,887 discloses polyoxymethylene molding compositions exhibiting improved physical properties comprising an admixture of a polyoxymethylene polymer, a fibrous reinforcement which can include cellulosic fiber, and a polycarbodiimide.

U.S. Pat. Nos. 3,406,129 discloses melt blends of moldable cellulose polymer having free hydroxyl groups with up to 50% of acetal polymer and U.S. Pat. No. 3,406,130 discloses colloidal dispersions of such blends with certain solvents for the cellulose polymer, which compositions are alleged to have improved melt strength and elongation. U.S. Pat. No. 3,406,129 specifically teaches that the use of greater than 50 weight percent polyacetal is detrimental to the melt blend. The cellulose disclosed in these references is not microcrystalline cellulose as it is moldable, and therefore, meltable at the melt processing temperature of polyacetal. Further, there is no disclosure of the particular stabilizer system used in the present invention.

While some of the reference discussed above disclose incorporating certain particular celluloses into polyacetal compositions, none disclose the specific cellulose used in the compositions of the present invention, nor do any disclose that microcrystalline or fibrous cellulose, in combination with at least one of certain co-stabilizer compounds, improves the stability of polyacetal compositions

SUMMARY OF THE INVENTION

The present invention relates to polyacetal compositions stabilized with 0.05 to 5 weight percent of microcrystalline or fibrous cellulose and 0.05 to 4 weight percent of at least one co-stabilizer compound selected from the group consisting of polyamides and polymers or oligomers containing hydroxy groups, wherein the microcrystalline cellulose has an average particle size of 100 microns or less and the polymer or oligomer containing hydroxy groups is substantially free of acidic materials. The resultant polyacetal compositions are characterized as having improved thermal stability, on average, over that of polyacetal alone, polyacetal stabilized with polyamide alone, and polyacetal stabilized only with polymers or oligomers containing hydroxy groups. The compositions of the present invention are useful in applications where polyacetal resin is used and where thermal stability in the polyacetal resin is desired.

DETAILED DESCRIPTION OF THE INVENTION

Polyacetals are known to destabilize in the absence of stabilizing agents. To alleviate such problem, typical commercially available polyacetal compositions are stabilized with polyamide (such as disclosed in Alsup et al, U.S. Pat. No. 2,993,025). However, it has been found that polyamides (also commonly referred to as "nylon") can react with formaldehyde released during processing, resulting in the reaction products and/or decomposition products contaminating the molded article. Polyacetal compositions are also known to be stabilized with certain hydroxy-containing polymers (such as disclosed in West, U.S. Pat. No. 4,766,168). Even so, there still exists a continuing need to develop effective and efficient stabilizers for polyacetal compositions.

This invention relates to certain polyacetal compositions which are characterized as having improved stability. More specifically, it relates to polyacetal compositions that are stabilized with a mixed stabilizer system of microcrystalline or fibrous cellulose and at least one co-stabilizer compound and that are characterized as having improved stability, as measured by lower evolution of formaldehyde. The stabilizer system, which consists of microcrystalline or fibrous cellulose, said microcrystalline and fibrous cellulose being non-melting at the temperature at which polyacetal is melt processed, and at least one co-stabilizer compound, used in the compositions of the present invention has been found to not degrade as readily as the conventional nylon stabilizers. Further, the thermal stability of polyacetal compositions stabilized with the mixed stabilizer system of the present invention is, on average, better than the thermal stability of polyacetal compositions stabilized with only an individual component of the present stabilizer system.

To achieve the improvements mentioned above, i.e., lower evolution of formaldehyde, the compositions of the present invention will consist essentially of (a) 0.05 to 5 weight percent microcrystalline or fibrous cellulose stabilizer, (b) 0.05 to 4 weight percent of at least one co-stabilizer compound selected from the group consisting of polyamides and meltable hydroxy containing polymers or oligomers, and (c) 91 to 99.9 weight percent of a polyacetal. Preferably, the compositions of the present invention consist essentially of 0.05 to 2 weight percent of component (a), 0.05 to 2 weight percent of component (b), and 96 to 99.9 weight percent of component (c). Most preferably, the compositions of the present invention consist essentially of 0.05 to 1 weight percent of component (a), 0.05 to 1 weight percent of component (b), and 98 to 99.9 weight percent of component (c). All the above weight percents are based upon the total weight of components (a), (b), and (c) only. If more than one co-stabilizer compound is used in the compositions of the present invention, the total weight percent of such co-stabilizer compounds in the compositions should be within the range disclosed above for component (b).

Component (c). Polyacetal

The term "polyacetal" as used herein includes homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

The polyacetals used in the compositions of the present invention can be branched or linear and will generally have a number average molecular weight in the range of 10,000 to 100,000, preferably 20,000 to 70,000. The molecular weight can conveniently be measured by gel permeation chromatography in m-cresol at 160° C. using a Du Pont PSM bimodal column kit with nominal pore size of 60 and 1000 A. Although polyacetals having higher or lower molecular weight averages can be used, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

As indicated above, the polyacetal can be either a homopolymer, a copolymer or a mixture thereof. Copolymers can contain one or more comonomers, such as those generally used in preparing polyacetal compositions. Comonomers more commonly used include alkylene oxides of 2-12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyacetal homopolymer is preferred over copolymer because of its greater stiffness. Preferred polyacetal homopolymers include those whose terminal hydroxyl groups have been end-capped by a chemical reaction to form ester or ether groups, preferably acetate or methoxy groups, respectively.

Components (a) and (b). The Stabilizer System

The stabilizers used in the compositions of the present invention are component (a) microcrystalline or fibrous cellulose and component (b) at least one co-stabilizer compound selected from certain hydroxy containing polymers and oligomers.

1. Component (a) Microcrystalline and Fibrous Cellulose

Component (a) stabilizer is either microcrystalline or fibrous cellulose. Microcrystalline cellulose is preferred. Both microcrystalline and fibrous cellulose are derived from naturally occurring cellulose and are non-melting at the melt processing temperature of polyacetal.

Microcrystalline cellulose is known in the art and is commercially available. It is described in detail in U.S. Pat. No. 3,023,104, incorporated herein by reference, and it is referred to therein as "cellulose crystallite aggregates" Microcrystalline cellulose is also described in "Hydrolysis and Crystallization of Cellulose", *Industrial and Engineering Chemistry*, vol. 42, 502–507 (1950).

Consistent with that which is taught in U.S. Pat. No. 3,023,104, the microcrystalline cellulose useful in the compositions of the present invention can be obtained from a commercial source or can be prepared by acid hydrolysis of cellulose. In either case, the microcrystalline cellulose should meet the purity requirements set forth below. In the acid hydrolysis of cellulose, the acid dissolves any amorphous portion of the original cellulose chains. The undissolved portion remaining from such hydrolysis is in a particulate, non-fibrous or crystalline form, said form being the result of the disruption of the continuity of the fine structures between the crystalline and amorphous regions of the original cellulose. The undissolved portion, which is in crystalline form, is known to be non-melting at the melt processing temperature of polyacetal. The melt processing temperature of polyacetal generally does not exceed 280° C. The methods of preparing microcrystalline cellulose by the acid hydrolysis of cellulose are known to those in the art and are, for example, described in U.S. Pat. No. 3,023,104, column 2 and the examples.

The microcrystalline cellulose used in the compositions of the present invention has a certain level-off degree of polymerization. Level-off degree of polymerization is described in U.S. Pat. No. 3,023,104. More specifically, it is described therein as being the point at which the cellulose that is subjected to acid hydrolysis reaches, after a certain period of time, a substantially constant molecular weight. In other words, it is the point at which the number of repeating units or monomers, sometimes designated anhydroglucose units, which make up the cellulosic material, becomes relatively constant. It is at this point that it is apparent that the degree of polymerization of the material has leveled off, hence the name level-off degree of polymerization.

Consistent with what is disclosed in U.S. Pat. No. 3,023,104, the microcrystalline cellulose useful in the present compositions has a preferred average level-off degree of polymerization of 125 to 375 anhydroglucose units. Ideally, within this range all of the material should have the same degree of polymrization but as this is difficult, if not impossible, to achieve, it is preferred that at least 85% of the material have an actual degree of polymerization not less than 50 and not more than 550. More preferably, within the average level-off degree of polymerization of 125 to 375, at least 90% of the material should have an actual degree of polymerization within the range of 75 to 500, and it is still more preferred that at least 95% of the material has an actual degree of polymerization in the range of 75 to 450. The more preferred average level-off degree of polymerization for the microcrystalline cellulose useful herein is in the range of 200 to 300, of which material at least 90% has an actual degree of polymerization in the range of 75 to 550. The most preferred average level-off degree of polymerization for the microcrystalline cellulose useful herein ranges from 175 to 225.

As taught in U.S. Pat. No. 3,023,104, microcrystalline cellulose will usually have an average particle size of 300 microns. For purposes of this invention, the average particle size is the point at which 50% of the particles are greater than average and 50% of the particles are less than average. Average particle size can be determined by standard techniques, such as microscopic inspection, gravitational sedimentation, sieve analysis, and electron microscopy. The preferred method of determining particle size is gravitational sedimentation.

It has been found that, for compositions of the present invention, stability increases as the average particle size of the microcrystalline cellulose decreases. As such, although microcrystalline can have an average particle size of about 300 microns, it is preferred that the average particle size of the microcrystalline cellulose used herein be 100 microns or less, more preferably 50 microns or less, even more preferably 25 microns or less, and most preferably 10 microns or less.

Fibrous cellulose is known in the art and is commercially available. It can be prepared from naturally occurring cellulose by techniques readily available to those skilled in the art. For example, a fibrous cellulose can be made by pulverizing wood pulp and then subsequently purifying it to meet the purity requirements described below. It is also a naturally occurring substance, an example of which is cotton linter. Fibrous cellulose generally exists in the form of flat ribbons. The width and thickness of these flat ribbons of fibrous cellulose is not considered critical in achieving the results exemplified herein. In general, however, the width of these flat ribbons will be, on average, approximately 25 microns and the thickness of these flat ribbons will be, on average, 6 microns. The length of the flat ribbons of the fibrous cellulose is also not considered critical in achieving the results exemplified herein. Fibrous cellulose is commercially available over a range of average fiber lengths, including from 300 microns down through less than 22 microns. Although average fiber length is not considered critical, it is expected that stability results will improve as average fiber length decreases due to the increase that such a decrease in average fiber length causes in the surface area of the fibrous cellulose stabilizer.

Another type of naturally occurring fibrous cellulose can be obtained from cellulose-producing bacteria, such as acetobacter and gluconobacter, via standard fermentation processes. After the fermentation process, the bacterial cells are destroyed via a hot caustic treatment and bacterial cellulose fibers are isolated by a series of washing and de-watering steps. The bacterial cellulose fibers that result can occur as intricately cross-linked networks or as distinct fibers. The thickness of these bacterial cellulose fibers is typically about 0.1 microns.

It is important that both the microcrystalline cellulose and the fibrous cellulose used in the compositions of the present invention be substantially free of compounds which destabilize acetal resins. Destabilizing impurities that are likely to occur in commercially available microcrystalline and fibrous cellulosics that are useful in the compositions of the present invention can be assayed via (1) the pH of an aqueous suspension of 1-10 weight percent microcrystalline or fibrous cellulose, (2) the non-volatile ash content of the microcrystalline or fibrous cellulose, and/or (3) the heavy metal content of the microcrystalline or fibrous cellulose.

More specifically, it is recommended that, for optimum results, the pH of an aqueous suspension of 1-10 weight percent of the microcrystalline or fibrous cellulose useful in the compositions of the present invention be in the range of 5.5-7 for homopolymer polyacetal and in the range of 5.5-8 for copolymer polyacetal. It is more preferred that the pH of the suspension be in the range of 5.5-7 for both homopolymer and copolymer polyacetal. It is recommended that the non-volatile ash content (ashing conducted at greater than or equal to 800° C.) of the microcrystalline cellulose or fibrous cellulose be less than 0.25%, more preferably less than 0.10%, and most preferably less than 0.02%. It is also recommended that the heavy metal content of the microcrystalline cellulose and the fibrous cellulose be less than 10 ppm. For maximum thermal stability results, it is generally recommended that the non-volatile ash content and the heavy metal content of the microcrystalline cellulose and the fibrous cellulose be minimized.

2. Component (b). At Least One Co-stabilizer Compound

The term "co-stabilizer compound" as used herein means those compounds selected from the group consisting of polyamides and certain meltable polymers or meltable oligomers containing hydroxy groups. The component (b) at least one co-stabilizer compound may be one co-stabilizer compound or it may be more than one co-stabilizer compound.

The polyamide co-stabilizer compound useful in the compositions of the present invention is known in the art and is further known to be a thermal stabilizer for polyacetal. Such polyamide co-stabilizer compounds are commercially available and can be prepared by techniques readily available to those skilled in the art. Polyamide co-stabilizer compounds useful in the compositions of the present invention are described in several U.S. patents, including Alsup et al, U.S. Pat. No. 2,993,025 and Johnson, U.S. Pat. No. 4,098,843, each of which is incorporated herein by reference. A preferred polyamide is nylon 66 predispersed in a carrier resin (as described in Johnson, U.S. Pat. No. 4,098,843). Another preferred polyamide is a 33/23/43 terpolymer of nylon 66, nylon 6/10, and nylon 6, respectively. Yet another preferred polyamide is an 85/15 copolymer of nylon 66 and nylon 6, respectively, predispersed in a carrier resin, such as, for example, a thermoplastic polyurethane carrier resin. Polyamide copolymers of the immediately preceding type are described in detail in Wagman, U.S. Pat. No. 4,640,949, incorporated herein by reference.

The certain meltable polymers or meltable oligomers containing hydroxy groups co-stabilizer compounds useful in the compositions of the present invention are known in the art and are described in U.S. Pat. No. 4,766,168 and U.S. Pat. No. 4,814,397, each of which is incorporated herein by reference. By the term "meltable", it is meant that the co-stabilizer compound has a melting point or a glass transition temperature, as measured by standard methods, that is less than the temperature at which the polyacetal composition is melt processed.

Specifically, the meltable polymer or meltable oligomer containing hydroxy groups co-stabilizer compound described in U.S. Pat. No. 4,766,168 is a polymer or oligomer containing hydroxy groups wherein the atoms in the backbone to which the hydroxy groups are attached, either directly or indirectly, are separated from each other by not more than twenty chain atoms. Preferably, the polymer or oligomer containing hydroxy groups co-stabilizer compound is an hydroxy containing polymer or oligomer containing on average at least one hydroxy group per each twenty carbon atoms in the backbone of the polymer or oligomer and not more than one hydroxy group per carbon atom in the backbone. More preferably, the ratio of carbon atoms in the backbone will be 1:2-1:10, and most preferably 1:2-1:5. Specific preferred meltable polymers containing hydroxyl groups co-stabilizer compounds include poly(vinyl alcohol), poly(ethylene vinyl alcohol), hydroxyesters of poly(meth)acrylates, such as poly(hydroxypropyl methacrylate) or poly(hydroxyethyl methacrylate), and vinyl alcohol/methylmethacrylate copolymers. The preferred meltable polymer containing hydroxyl groups co-stabilizer compound is poly(ethylene vinyl alcohol).

Specifically, the meltable polymer or meltable oligomer containing hydroxy groups co-stabilizer compound described in U.S. Pat. No. 4,814,397 is a polymer or oligomer containing both hydroxy groups and at least one other functional group that is a stronger Lewis base than the hydroxy groups wherein the atoms in the backbone of the polymer or oligomer to which the hydroxy groups are attached, indirectly or directly, are separated, on average, by not more than twenty chain atoms. Examples of the other functional groups include amides, amines, ureas, and urethanes. Amides and amines are preferred; amides are most preferred. Specific preferred examples of this particular hydroxy containing co-stabilizer compound include copolymers of hydroxypropyl methacrylate with acrylamide, methacrylamide, dimethylaminoethyl methacrylate, or vinyl 2-pyrrolidone.

It is important that both the microcrystalline or fibrous cellulose and the co-stabilizer compounds used in the compositions of the present invention be substantially free of compounds which distabilize acetal resins. Heavy metal content, ash content, and pH range for microcrystalline and fibrous cellulose has been detailed above. Other purity recommendations are detailed below.

In stabilizing ester-capped or partially ester-capped polyacetal homopolymer, it is recommended that the microcrystalline and fibrous cellulose and the co-stabilizer compounds be substantially free of basic materials, such as metals, ammonium hydroxide, sodium acetate, and other alkali and alkali earth acetates which can destabilize the polyacetal. Basic impurities in microcrystalline and fibrous cellulose should preferably be removed to levels of not more than 200 ppm and most preferably to not more than 10 ppm while basic impurities in the co-stabilizer compound should preferably be removed to levels of not more than 50 ppm and most preferably to not more than 10 ppm. In stabilizing polyacetal copolymer or homopolymer that is substantially all ether-capped, higher concentrations of basic materials in the microcrystalline and fibrous cellulose and the co-stabilizer compound can be tolerated. In addition, it should be understood that if the impurity in the microcrystalline and/or fibrous cellulose or the co-stabilizer compound is only weakly basic, relatively higher amounts can be tolerated.

In using the microcrystalline and fibrous cellulose and the co-stabilizer compounds in stabilizing both homopolymer and copolymer polyacetal, it is also recommended that acidic impurities in the microcrystalline and fibrous cellulose and the co-stabilizer compound should be minimized. For microcrystalline and fibrous cellulose, acidic impurities should preferably be removed to levels of not more than 250 ppm and most preferably to not more than 10 ppm while for the co-stabilizer compound, such impurities should preferably be removed to not more than 50 ppm and most preferably to not more than 10 ppm. As with the basic impurities, it should be understood that if the impurity in the microcrystalline and/or fibrous cellulose or the co-stabilizer compound is only weakly acidic, relatively higher amounts can be tolerated.

Accordingly, when such acidic and/or basic impurities are present in the microcrystalline and/or fibrous cellulose and/or the co-stabilizer compounds in amounts large enough to cause destabilization of the polyacetal compositions, then the microcrystalline and/or fibrous cellulose and/or the co-stabilizer compound should be purified before it is introduced into compositions of the present invention. Volatile impurities in the microcrystalline and/or fibrous cellulose and/or the co-stabilizer compound can be removed by use of a vacuum oven. Non-volatile impurities in the microcrystalline and/or fibrous cellulose and/or the co-stabilizer compound can be purified by washing the microcrystalline and/or fibrous cellulose or the co-stabilizer compound with an appropriate liquid, such as, for example, water.

It should be understood that the compositions of the present invention can include, in addition to the polyacetal, the microcrystalline or fibrous cellulose, and the at least one co-stabilizer compound, other ingredients, modifiers and additives as are generally used in polyacetal molding resins, including co-stabilizers other than those described herein, anti-oxidants, pigments, cobrants, toughening agents, reinforcing agents, uv stabilizers, hindered amine stabilizers, nucleating agents, lubricants, glass fibers, silicone oil, polytetrafluoroethylene powder or fiber, and fillers. It should also be understood that some pigments and colorants can, themselves, adversely affect the stability of polyacetal compositions.

Preparation of the Compositions

The compositions of the present invention can be prepared by mixing the microcrystalline cellulose or fibrous cellulose stabilizer and the co-stabilizer compound with the polyacetal polymer at a temperature above the melting point of the polyacetal component of the compositions using any intensive mixing device conventionally used in preparing thermoplastic polyacetal compositions, such as rubber mills, internal mixers such as "Banbury" and "Brabender" mixers, single or multiblade internal mixers with a cavity heated externally or by friction, "Ko-kneaders", multibarrel mixers such as "Farrel Continuous Mixers", injection molding machines, and extruders, both single screw and twin screw, both co-rotating and counter rotating. These devices can be used alone or in combination with static mixers, mixing torpedoes and/or various devices to increase internal pressure and/or the intensity of mixing, such as valves, gates or screws designed for this purpose. Extruders are preferred. Of course, such mixing should be conducted at a temperature below which significant degradation of the polyacetal component of the composition will occur. Generally, polyacetal compositions are melt processed between 170° C. to 280° C., preferably between 185° C. to 240° C., and most preferably 195° C. to 225° C.

Shaped articles can be made from the compositions of the present invention using any of several common methods, including compression molding, injection molding, extrusion, blow molding, rotational molding, melt spinning and thermoforming. Injection molding is preferred. Examples of shaped articles include sheet, profiles, rod stock, film, filaments, fibers, strapping, tape tubing and pipe. Such shaped articles can be post treated by orientation, stretching, coating, annealing, painting, laminating and plating. Such shaped articles and scrap therefrom can be ground and remolded.

Processing conditions used in the preparation of the compositions of the present invention and shaped articles made therefrom include melt temperatures of about 170°–280° C., preferably 185°–240° C., most preferably 200°–230° C. When injection molding the compositions of the present invention, it is preferred that the mold be as cold as possible consistent with the intricacy of the shape being produced. Generally, the mold temperature will be 10°–120° C., preferably 10°–100° C., and most preferably about 50°–90° C.

EXAMPLES

In the following examples, there are shown specific embodiments of the present invention and certain comparisons with embodiments of control experiments outside the limits of the present invention. It will be seen that the compositions of the present invention are characterized by improved stability. All parts and percentages are by weight, and all temperatures are in degrees Celsius unless otherwise specified. Measurements not originally in SI units have been so converted and rounded where appropriate.

The polyacetals used in the examples below were as follows:

(a) POLYACETAL A - an acetate end-capped homopolymer having a number average molecular weight of about 40,000 and (b) POLYACETAL B - an acetate end-capped homopolymer having a number average molecular weight of about 33,000.

The microcrystalline cellulose stabilizers used in the examples below were as follows:

(a) "MC3" was a commercially available microcrystalline cellulose which was ground via standard techniques of air jet milling to an average particle size of about 3 microns, (b) "MC6" was a commercially available microcrystalline cellulose having an average particle size of about 6 microns, (c) "MC11" was a commercially available microcrystalline cellulose which was air jet milled by standard techniques to an average particle size of about 11 microns, (d) "MC20" was a commercially available microcrystalline cellulose having an average particle size of about 20 microns, (e) "MC50" was a commercially available microcrystalline cellulose having an average particle size of about 50 microns, and (f) "MC100" was a commercially available microcrystalline cellulose having an average particle size of about 100 microns.

The average level-off degree of polymerization for each microcrystalline cellulose used in the examples ranged from 190 to 200. Each microcrystalline cellulose used in the examples had less than 10 ppm heavy metals and less than 0.05% ash. The pH of a 10% aqueous suspension of each microcrystalline cellulose used in the examples ranged from about 5.5–7.

The fibrous cellulose used in the examples below were as follows:

"FC1" was a commercially available fibrous cellulose having an average fiber length of about 300 microns, an ash content of about 0.16%, and a pH, measured on a 5% aqueous suspension of the microcrystalline cellulose, of 5.95.

"FC2" was a commercially available fibrous cellulose having an average fiber length of less than 90 microns, an ash content of 0.15%, and a pH, measured on both 5% and 10% aqueous suspensions of the microcrystalline cellulose, of 5.2.

The co-stabilizer compounds used in the examples that follow were:

(a) "Nylon" was a 33/23/43 terpolymer of nylon 66, nylon 6/10 and nylon 6, respectively, and (b) "EVOH" was ethylene/vinyl alcohol copolymer containing 29 weight percent ethylene and 71 weight percent vinyl alcohol, and having an apparent melt viscosity at 210° C. of 9500 P, which had been purified such that it contained less than 10 ppm ash.

The antioxidants used in the examples that follow were:

(a) "antioxidant A" was triethyleneglycol bis(3-(3'-tert-butyl-4'-hydroxy-5'-methylphenyl)proprionate) and (b) "antioxidant B" was N,N'-hexamethylene bis(3,5-di-tert-butyl-4-hydroxyhydrocinnamide).

(c) "antioxidant C" was tetrakis(methylene (3,5-di-tert-butyl-4-hydroxyhydrocinnamate))methane.

Other additives used in some of the examples that follow were:

(a) "PTFE powder" was polytetrafluoroethylene powder irradiated at a level of 7.5 mrad (b) "PTFE fiber" was polytetrafluoroethylene flock fiber having an average length of 1/64th of an inch (c) "Si oil" was polydimethylsiloxane, trimethylsaloxy terminated silicone oil having a viscosity of 500 centistokes and a nominal molecular weight of 17,250.

In the following examples, thermal stability of the compositions was determined using a thermally evolved formaldehyde (TEF) test procedure. A weighed sample of polyacetal composition was placed in a tube and the tube was fitted with a cap for introduction of nitrogen to the test sample for removal of any evolved gases from the apparatus while maintaining the sample in an oxygen-free environment. The sample was heated at either 250° C. or 259° C. in a silicone oil bath. The nitrogen and any evolved gases transported thereby were bubbled through 75 ml of a 40 g/l sodium sulfite in water solution. Any evolved formaldehyde reacts with the sodium sulfite to liberate sodium hydroxide. The sodium hydroxide was continuously neutralized with standard 0.1 N HCl. The results were obtained as a chart of ml of titer versus test time. The percent evolved formaldehyde was calculated by the formula $$(V)(N)\frac{0.03 \times 100}{SW}$$

where V is the volume of titer in milliliters

N is the normality of the titer, and

SW is the sample weight in grams. The factor "0.03" is the milliequivalent weight of formaldehyde in g/milliequivalent.

Thermally evolved formaldehyde results are reported in the data tables below under columns headed "Wt % $CH_2O$ at $\times$ °C". The time period for which the sample was heated is also indicated in said data tables.

EXAMPLES 1-6. EFFECT OF MICROCRYSTALLINE CELLULOSE AND AT LEAST ONE CO-STABILIZER COMPOUND ON THE THERMAL STABILITY OF POLYACETAL

The components of Examples 1-6 and C1-C8 are listed in Tables IA-IC, below. For each example, the components were mixed together and melt compounded on a 28 mm Werner and Pfleiderer twin screw extruder with barrel temperature settings of 150° C. to 180° C., die temperature setting of 200° C. and screw speed of 150 rpm. The temperature of the melt as it exited the die for the examples ranged from 221° C. to 224° C. The melt compounded sample was tested by the TEF test, described above. The results are reported below in Tables IA-IC.

The results in Table IA, below, showed that when microcrystalline cellulose and at least one co-stabilizer compound were together incorporated into polyacetal, the thermal stability obtained on the resultant polyacetal composition (example 1) was better than the thermal stability obtained for the same polyacetal composition with the co-stabilizer compound but without the microcrystalline cellulose (example C1) and it was also better than the thermal stability obtained for the same polyacetal composition with microcrystalline cellulose but without the co-stabilizer compound (example C2). Example 2 showed that improved stability is imparted to the polyacetal when there is incorporated therein microcrystalline cellulose and more than one co-stabilizer compound.

The results below in Table IB and Table IC again showed that best thermal stability results for polyacetal were obtained when the stabilizer incorporated into the polyacetal was a combination of microcrystalline cellulose and at least one co-stabilizer compound.

TABLE IA

EFFECT OF MICROCRYSTALLINE CELLULOSE AND A CO-STABILIZER ON POLYACETAL STABILITY

| Eg. No. | Wt % PAc | Wt % Micro-crystalline Cellulose | Wt % Costa-bilizer Compound | Wt % AO | Wt % $CH_2O$ @ 259° C. 15 min | 30 min |
|---|---|---|---|---|---|---|
| C1 | 99.7A | — | 0.2 EVOH | 0.1B | 0.18 | 0.99 |
| C2 | 99.4A | 0.5 MC11 | — | 0.1B | 0.27 | 0.87 |
| 1 | 99.2A | 0.5 MC11 | 0.2 EVOH | 0.1B | 0.09 | 0.42 |
| C3 | 99.6A | — | 0.2 EVOH 0.1 Nylon | 0.1B | 0.14 | 0.82 |
| 2 | 99.1A | 0.5 MC11 | 0.2 EVOH 0.1 Nylon | 0.1B | 0.07 | 0.39 |

PAc = polyacetal

TABLE IB

EFFECT OF MICROCRYSTALLINE CELLULOSE AND A "NYLON" CO-STABILIZER COMPOUND ON POLYACETAL STABILITY

| Eg. No. | Wt % PAc | Wt % Micro-crystalline Cellulose | Wt % Costa-bilizer Compound | Wt % AO | 15 min | 30 min |
|---|---|---|---|---|---|---|
| | | | | | Wt % $CH_2O$ @ 259° C. | |
| C4 | 99.4A | 0.5 MC20 | — | 0.1A | 0.13 | 0.53 |
| C5 | 98.9A | — | 1.0 Nylon | 0.1A | 0.05 | 0.41 |
| 3 | 99.4A | 0.25 MC20 | 0.25 Nylon | 0.1A | 0.04 | 0.26 |
| | | | | | Wt % $CH_2O$ @ 250° C. | |
| C6 | 99.4A | 0.5 MC20 | — | 0.1B | 0.13 | 0.52 |
| 4 | 99.4A | 0.4 MC20 | 0.1 Nylon | 0.1B | 0.04 | 0.28 |

PAc = polyacetal

TABLE IC

EFFECT OF MICROCRYSTALLINE CELLULOSE AND AN "EVOH" CO-STABILIZER COMPOUND ON POLYACETAL STABILITY

| Eg. No. | Wt % PAc | Wt % Micro-crystalline Cellulose | Wt % Costa-bilizer Compound | Wt % AO | Wt % $CH_2O$ @ 259° C. 15 min | 30 min |
|---|---|---|---|---|---|---|
| C7 | 99.4A | 0.5 MC20 | — | 0.1B | 0.20 | 0.66 |
| C8 | 98.9A | — | 1.0 EVOH | 0.1B | 0.09* | 0.69 |
| 5 | 99.4A | 0.25 MC20 | 0.25 EVOH | 0.1B | 0.05 | 0.33 |
| C4 | 99.4A | 0.5 MC20 | — | 0.1A | 0.13 | 0.53 |
| 6 | 99.4A | 0.25 MC20 | 0.25 EVOH | 0.1A | 0.04 | 0.26 |

PAc = polyacetal
C4 is the same composition as reported in TABLE IB

EXAMPLES 7-11. POLYACETAL WITH MICROCRYSTALLINE CELLULOSE OF VARYING PARTICLE SIZES

The components of Examples 7-11 and C9-C11 are listed in Table II, below. The compositions of the examples further each contained 0.1 weight percent antioxidant B. The components were mixed together, melt compounded, and extruded on a 2.5 inch Sterling single screw extruder with barrel temperature settings ranging from 150° C.-200 C. and with a screw speed of 50 rpm. The temperature of the melt as it exited the die ranged from 202° C. to 207° C. Each sample was subjected to the TEF test, described above.

The results for Examples 7-11 and C9-C11 are reported in Table II, below. The results showed that microcrystalline cellulose in combination with two co-stabilizer compounds improved the thermal stability of polyacetal, at short test times, to a greater extent than did a conventional polyamide stabilizer alone (example C9). The results further showed that as the average particle size of the microcrystalline cellulose decreased, the stability imparted to the polyacetal increased.

TABLE II
POLYACETAL WITH MICROCRYSTALLINE CELLULOSE OF VARYING PARTICLE SIZE

| Eg. No. | Wt % PAc | Wt % Micro-crystalline Cellulose | Wt % CoStab | Wt % $CH_2O$ @ 259° C. 15 min | 30 min |
|---|---|---|---|---|---|
| C9 | 98.9B | — | 1.00B | 0.13 | 0.59 |
| C10 | 98.9B | — | 0.75B 0.25A | 0.05 | 0.34 |
| C11 | 99.4B | — | 0.35B 0.15A | 0.07 | 0.35 |
| 7 | 98.9B | 0.5 MC3 | 0.35B 0.15A | 0.03 | 0.26 |
| 8 | 98.9B | 0.5 MC6 | 0.35B 0.15A | 0.02 | 0.21 |
| 9 | 98.9B | 0.5 MC20 | 0.35B 0.15A | 0.03 | 0.24 |
| 10 | 98.9B | 0.5 MC50 | 0.35B 0.15A | 0.06 | 0.52 |
| 11 | 98.9B | 0.5 MC100 | 0.35B 0.15A | 0.08 | 0.78 |

PAc = polyacetal
CoStab = co-stabilizer compound

EXAMPLES 12-13. EFFECT OF FIBROUS CELLULOSE AND A CO-STABILIZER COMPOUND ON POLYACETAL STABILITY

The components of Examples 12-13 and C12-C15 are listed in Table III, below. For each example, the components were mixed together, melt compounded, and extruded under the same conditions as were Examples 1-6, above. The melt compounded sample was tested by the TEF test, described above. The results are reported in Table III, below. Examples C14 and C15 illustrate the type of results that may be obtained when the fibrous cellulose used has a pH of less than 5.5.

TABLE III
EFFECT OF FIBROUS CELLULOSE AND A CO-STABILIZER COMPOUND ON POLYACETAL STABILITY

| Eg. No. | Wt % PAc | Wt % Fibrous Cellulose | Wt % Costabilizer Compound | Wt % AO | Wt % $CH_2O$ @ 259° C. 15 min | 30 min |
|---|---|---|---|---|---|---|
| C12 | 99.1B | — | 0.8 EVOH | 0.1B | 0.06 | 0.47 |
| C13 | 99.1B | — | 0.5 EVOH 0.3 Nylon | 0.1B | 0.08 | 0.48 |
| 12 | 94.1B | 5.0 FC1 | 0.8 EVOH | 0.1B | 0.28 | 0.66 |
| 13 | 94.1B | 5.0 FC1 | 0.3 Nylon | 0.1B | 0.13 | 0.34 |
| C14 | 99.2B | 5.0 FC2 | 0.5 EVOH 0.3 Nylon | 0.1B | 0.6 | 3.41 |
| C15 | 79.3B | 20.2 FC2 | 0.4 EVOH 0.2 Nylon | 0.08B | 1.31 | 5.89 |

PAc = polyacetal

EXAMPLES 14-17. POLYACETAL COMPOSITIONS CONTAINING MIXED CELLULOSE STABILIZER SYSTEM AND OTHER ADDITIVES

The components of Examples 14-17 and C16-18 are listed in Table IV, below. Each composition contains an additive in addition to the stabilizers and the antioxidants. For each example, the components were melt compounded on a 53 mm twin screw extruder with a barrel temperature setting of about 210° C. The temperature of the melt as it exited the die ranged from about 210° C. to 235° C. Each sample was subjected to the TEF test, described above.

Thermal stability results showed the best stability at longer test time was achieved when the composition tested contained microcrystalline cellulose.

TABLE IV
POLYACETAL COMPOSITIONS CONTAINING MICROCRYSTALLINE CELLULOSE AND OTHER ADDITIVES

| Eg. No. | Wt % PAC | Wt % Microcrystalline Cellulose | Wt % Costabilizer Compound | Wt % AO | Wt % Additive | Wt % $CH_2O$ @ 250° C. 15 min | 30 min | 60 min |
|---|---|---|---|---|---|---|---|---|
| C16 | 99.35A | — | 0.25 nylon 0.75 EVOH | 0.075B 0.075A | 1.50 PTFE powder | 0.24 | 0.93 | 2.13 |
| 14 | 97.35A | 0.50 MC6 | 0.15 nylon 0.35 EVOH | 0.075B 0.075A | 1.50 PTFE powder | 0.18 | 0.52 | 1.14 |
| C17 | 97.35A | — | 0.25 nylon 0.75 EVOH | 0.075B 0.075C | 1.50 PTFE powder | 0.21 | 0.78 | 1.84 |
| 15 | 97.35A | 0.50 MC6 | 0.15 nylon 0.35 EVOH | 0.075B 0.075C | 1.50 PTFE powder | 0.20 | 0.60 | 1.22 |
| C18 | 78.85A | — | 0.25 nylon 0.75 EVOH | 0.075B 0.075A | 20.0 PTFE fiber | 0.23 | 0.96 | 2.28 |
| 16 | 78.85A | 0.50 MC6 | 0.15 nylon 0.35 EVOH | 0.075B 0.075A | 20.0 PTFE fiber | 0.29 | 0.85 | 2.16 |
| 17 | 77.85A | 0.50 MC6 | 0.15 Nylon 0.35 EVOH | 0.075B 0.075A | 20.0 PTFE fiber 1.0 Si oil | 0.14 | 0.50 | 1.32 |

I claim:
1. A thermoplastic polyacetal composition consisting essentially of
(a) 0.05 to 5 weight percent of a stabilizer selected from the group consisting of microcrystalline cellulose and fibrous cellulose,
(b) 0.05 to 4 weight percent of at least one co-stabilizer compound selected from the group consisting of polyamides, meltable hydroxy containing polymers, and meltable hydroxy containing oligomers, and
(c) 91 to 99.9 weight percent of at least one polyacetal, provided that the component (a) stabilizer has an average particle size of 100 microns or less, provided further that the atoms in the backbone of the component (b) meltable hydroxy containing polymers or oligomers to which the hydroxy groups are attached, directly or indirectly, are separated by not more than twenty chain atoms an that the component (b) is substantially free of acidic materials, and further provided that the above-stated percentages are based on the total amount of components (a), (b) and (c) only.

2. The composition of claim 1 wherein the component (a) stabilizer is substantially free of acidic materials.

3. The composition of claim 1 wherein the component (c) polyacetal is homopolymer and the component (a) and the component (b) are substantially free of acidic materials and basic materials.

4. The composition of claim 1 wherein the component (a) comprises 0.05 to 2 weight percent of the composition and the component (b) comprises 0.05 to 2 weight percent of the composition.

5. The composition of claim 1 wherein the component (a) comprises 0.05 to 1 weight percent of the composition and the component (b) comprises 0.05 to 1 weight percent of the composition.

6. The composition of claim 1 wherein the component (a) stabilizer is microcrystalline cellulose having an average particle size of 50 microns or less.

7. The composition of claim 1 wherein the component (a) stabilizer is microcrystalline cellulose having an average particle size of 25 microns or less.

8. The composition of claim 1 wherein the component (a) stabilizer is microcrystalline cellulose having an average particle size of 10 microns or less.

9. The composition of claim 1 wherein the component (a) stabilizer is fibrous cellulose.

10. The composition of claim 9 wherein the fibrous cellulose is derived from cellulose-producing bacteria.

11. The composition of claim 1 wherein the component (b) co-stabilizer compound is polyamide.

12. The composition of claim 11 wherein the polyamide is selected from the group consisting of (a) 33/23/43 terpolymers of nylon 66, nylon 6/10, and nylon 6, respectively, (b) nylon 6/6 dispersed in a carrier resin, and (c) 85/15 copolymers of nylon 66/nylon 6, respectively, dispersed in a carrier resin.

13. The composition of claim 1 wherein the component (b) co-stabilizer compound is a meltable hydroxy containing polymer or a meltable hydroxy containing oligomer.

14. The composition of claim 13 wherein the meltable hydroxy containing polymer is poly(ethylene vinyl alcohol).

15. The composition of claim 1 wherein the component (c) polyacetal is a homopolymer.

16. The composition of claim 15 wherein the component (c) polyacetal is a copolymer.

17. The composition of claim 1 wherein the component (c) polyacetal has a number average molecular weight of 10,000–100,000.

18. The composition of claim 1 further consisting essentially of at least one of co-stabilizers other than those of claim 1, antioxidants, colorants, reinforcing agents, toughening agents, uv stabilizers, hindered amine stabilizers, nucleating agents, lubricants, and fillers.

19. The composition of claim 1 further consisting essentially of at least one of polytetrafluoroethylene powder, polytetrafluoroethylene fiber, and silicone oil.

20. Shaped articles made from the composition of claim 1.

21. A method of preparing the composition of claim 1 comprising mixing component (a) and component (b) with the polyacetal polymer at a temperature above the melting point of the polyacetal polymer and below the temperature at which degradation of the components will occur.

22. The composition of claim 1 wherein the meltable hydroxy containing polymers and meltable hydroxy containing oligomers also contain at least one other functional group that is a stronger Lewis base than the hydroxy groups.

* * * * *